United States Patent [19]

Alonso

[11] 4,401,224
[45] Aug. 30, 1983

[54] FEEDING BOTTLE FOR INFANTS

[76] Inventor: Ferdinand Alonso, San Leandro, Calif.

[21] Appl. No.: 79,713

[22] Filed: Sep. 28, 1979

Related U.S. Application Data

[63] Continuation-in-part of Ser. No. 29,618, Apr. 13, 1979, abandoned.

[51] Int. Cl.³ .............................................. A61J 9/04
[52] U.S. Cl. ................................. 215/11 B; 137/511; 137/854
[58] Field of Search ................. 215/11 B, 11 R, 11 D; 137/852, 854, 511

[56] References Cited

U.S. PATENT DOCUMENTS

| | | | |
|---|---|---|---|
| 362,554 | 5/1887 | Suydam | 215/11 B |
| 2,084,099 | 6/1937 | Maccoy | 215/11 B |
| 2,270,333 | 1/1942 | Osborn | 137/854 |
| 2,372,281 | 3/1945 | Jordan | 215/11 B |
| 2,394,722 | 2/1946 | Sloane | 215/11 B |
| 2,579,855 | 12/1951 | Pockel | 137/854 |
| 2,769,457 | 11/1956 | Wittenberg | 137/854 |
| 3,043,404 | 7/1962 | Peras | 137/854 |
| 3,124,488 | 3/1964 | Ruetschi | 137/854 |
| 3,200,980 | 8/1965 | Janell | 215/11 B |
| 3,403,696 | 10/1968 | Oynchau | 137/854 |
| 3,511,407 | 5/1970 | Palma | 215/11 B |
| 3,610,273 | 10/1971 | Russell | 137/854 |
| 3,682,817 | 8/1972 | Marx | 137/854 |
| 3,768,682 | 10/1973 | Meyers | 215/11 B |
| 3,768,683 | 10/1973 | Bosch | 215/11 B |
| 4,111,231 | 9/1978 | Leppich | 137/854 |

FOREIGN PATENT DOCUMENTS

| 1371714 | 7/1964 | France | 137/854 |
|---|---|---|---|

*Primary Examiner*—Herbert F. Ross
*Attorney, Agent, or Firm*—Edward Brosler; Merwyn Brosler

[57] ABSTRACT

An infant's feeding bottle employing a valve to assure approximately atmospheric pressure within the bottle during feeding, the valve and valve stem being of like material and of simple unitary construction whereby to avoid numerous problems such as rust, sticking, and development of unsanitary conditions associated with other valves under like conditions of use.

10 Claims, 5 Drawing Figures

FEEDING BOTTLE FOR INFANTS

INVENTION

This is a continuation-in-part application based on application Ser. No. 29618, filed Apr. 13, 1979 for a FEEDING BOTTLE FOR INFANTS, now abandoned.

My invention relates to feeding of infants and more particularly to bottle feeding.

In the course of feeding infants from the bottle, it is well known that such infants attributable to creating of vacuum as the contents are withdrawn, must periodically release the nipple and gulp in quantities of air, thus not only prolonging the feeding process, but necessitating burping of the infant now and then, as the feeding process continues.

One practical solution to such problem involves the use of a collapsible bag of the disposable type, inserted into a holder which simulates a conventional bottle but exposes the collapsible bag to atmosphere, whereby as an infant withdraws milk from the bag, the bag progressively collapses, and the milk may be continually withdrawn without the formation of a vacuum in the bag.

Other attempts at solving this problem involved use of valves as in U.S. Pat. Nos. 3,768,683; 2,084,099; 3,511,407 and 3,768,682. Commercial acceptability of this approach to a solution requires assured sealing, proper functioning and maintained sanitation.

Among the objects of my invention are:
1. To provide a novel and improved feeding bottle assembly which may be used in the same manner as a conventional feeding bottle but without the creation of a vacuum therein during a feeding period;
2. To provide a novel and improved feeding bottle assembly which does not involve any disposable items and yet will avoid the problems accompanying use of conventional bottles in feeding infants;
3. To provide a novel and improved feeding bottle assembly employing a valve to realize the foregoing advantages and which will avoid many of the deficiencies of prior art valves employed in connection with feeding bottles.
4. To provide a novel and improved feeding bottle assembly having the aforementioned characteristics and advantages and which lends itself to be readily cleaned following each use.

Additional objects of my invention will be brought out in the following description of a preferred embodiment of the same, taken in conjunction with the accompanying drawings wherein FIG. 1 is a longitudinal view in section through a feeding bottle incorporating the present invention;

Figure 5:
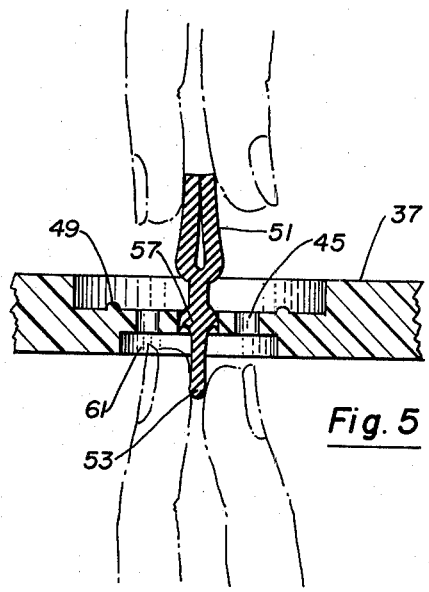
Figure 4:
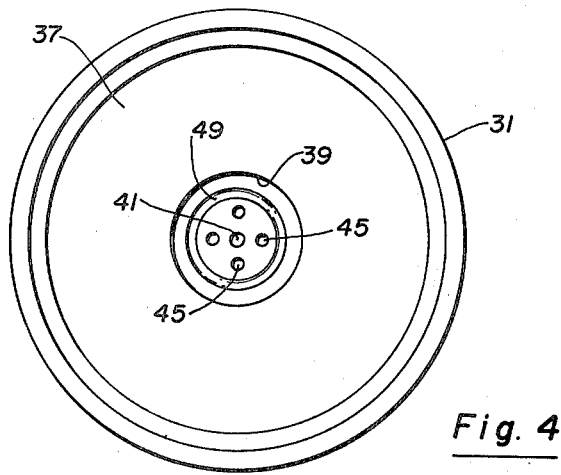
FIG. 4 is a plan view looking into the bottom closure of the embodiment of FIG. 3, prior to installation.

FIG. 5 is a view depicting the manner of installation and removal of such a valve component with respect to the bottom closure, Referring to the drawings for details of my invention in its preferred form, the same may involve a bottle 1 of conventional size and shape, having a bottom 3 at one end and an opening 5 at the other end. The means provided for closing such opening and permitting of the withdrawal of liquid contents from the bottle may be much the same as used with conventional feeding bottles.

In the bottom of the bottle, however, I provide a normally closed valve assembly 9 sealed in an opening provided in the bottom. Such valve assembly may be any assembly suitable for the purpose, but the one disclosed involves a shallow cup 13 forming a recessed area in the bottom, said shallow cup having a central boss 15 rising from the floor of the cup. Arcuate perforations 17 in the cup bottom surrounding the boss, provide pathways for intake of air in response to reduction of pressure below atmospheric, in the bottle.

The rim of the shallow cup, functions as a valve seat 19 for a disc type valve 21 of flexible rubber or like material, which valve is anchored to the boss 15 by a valve stem 23 entering a longitudinal passage in the boss, to which it is cemented or glued.

The valve is tapered along its edge to enhance its flexibility and enable it to respond readily to reductions in pressure within the bottle.

The shallow cup 13 constitutes a recessed area in the bottom of the bottle and could be molded as a unitary part of the bottom.

As thus far described, the bottle, when filled with milk or other drinkable substance for the feeding of an infant, will retain the liquid contents as in a conventional bottle.

However, as the bottle is raised and tilted to allow an infant to drink therefrom, withdrawal of contents by the infant will cause intake of air to take the place of the liquid as it is being withdrawn. Because of such simultaneous intake of air, the infant will not experience the difficulty of continually drinking, as was previously experienced by the infant by reason of the information of a condition of vacuum within the conventional feeding bottle which caused the infant to periodically relax the nipple and gulp in air, which resulted in the subsequent necessity for burping the infant during a feeding operation, and considerably increasing the length of the feeding period.

Frequently during travel, the mother, to facilitate the feeding of an infant along the way or during a stop, will pack one or two prepared bottles in a hand bag or other suitable type of carrier along with other items. To avoid any accidental opening of the valve by inadvertent or accidental insertion of some item such as a pencil or the like via one of the arcuate openings in one of the bottles, which would permit drainage of the contents of the bottle into the hand bag or the like, I provide a vented guard over the opening to the valve.

Figure 1:
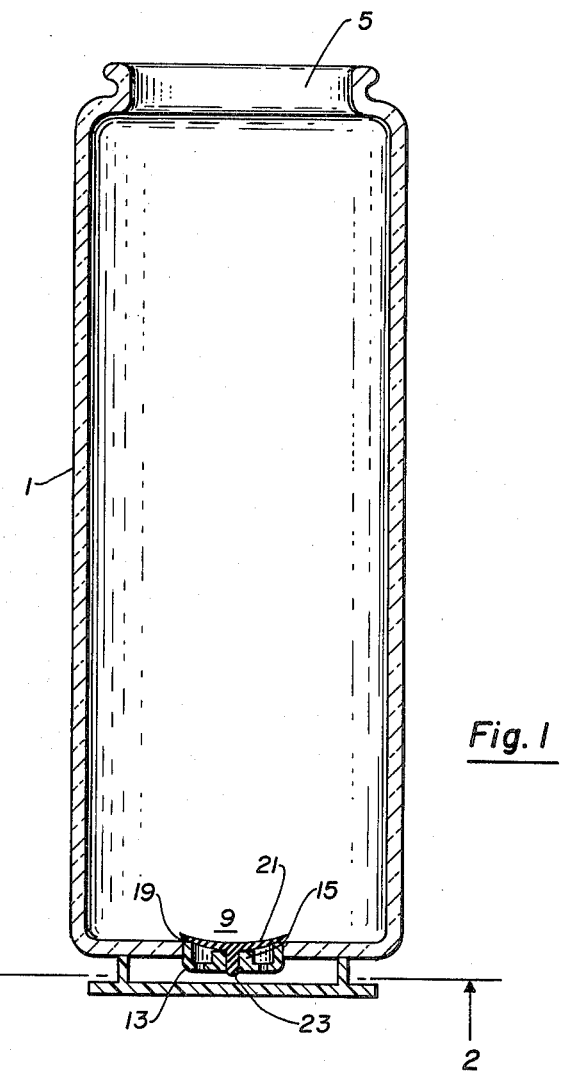
Figure 2:
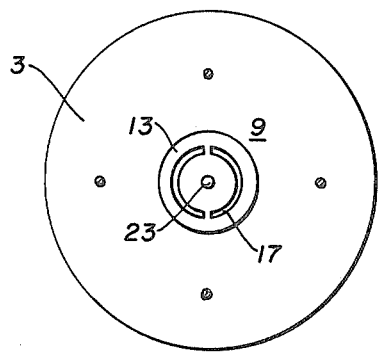
FIG. 2 is a view taken in the plane 2—2 of FIG. 1.

In the FIG. 1 embodiment of my invention, such vented guard may take the form of a circular disc 27 fastened, at spaced points, to the bottom of the bottle and in spaced relationship thereto, thus providing vent passages to the valve while protecting the valve against such accidental openings, as previously described.

By reason of the high degree of flexibility of the valve along its rim option, it will react to the slightest pressure from the outside, and, accordingly, lends itself to washing merely by swishing the bottle in water or other cleaning liquid.

Figure 3:
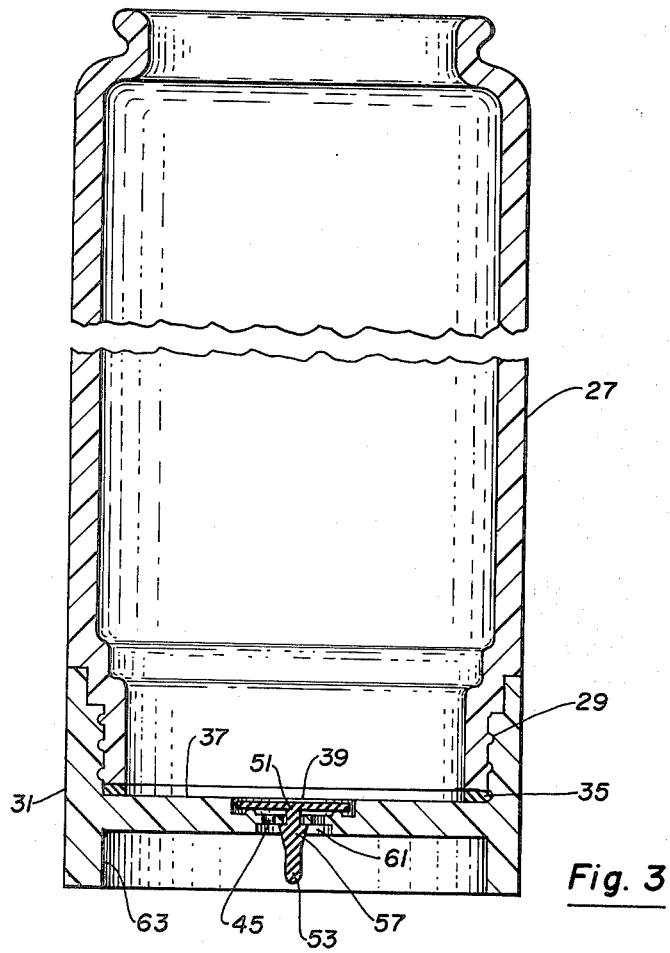
FIG. 3 is a longitudinal view in section through a different embodiment of the invention depicted in FIG. 1.

In the embodiment of FIG. 3, the bottle is formed of two component parts, a main body portion 27 formed with a reduced externally threaded end 29 of smaller diameter, and a bottom cap 31 threadable onto the lower end of the body portion, the outer diameter of the bottom cap being comparable to the larger outer diameter of the body portion to form a smooth outer cylindrical surface to the bottle.

A suitable ring seal 35 is provided between the lower edge of the body portion and the floor 37 of the bottom cap.

Centrally of the bottom cap is a recessed area 39 having a central passageway 41 through the floor of the recessed area, while to one side of this passageway, the floor 43 of the recessed area is provided with at least one vent opening and preferably a plurality of such vent openings 45 symetrically disposed with respect to the central passageway 41.

Surrounding the central passageway and the vent openings is a circular rib 49, preferably integrally molded on the floor of the recessed area, to function as a valve seat for a disc type valve 51 of flexible stretchable material to comprise the basic elements of a valve assembly, the valve having a valve stem 53 of like material for installation in the central passageway of the recessed area.

The valve stem, for the most part, is of a diameter which will permit of free passage through the central passageway, but has an intermediate portion 57 of an inverse truncated cone shape having a maximum diameter slightly exceeding that of the central passageway, thus enabling the valve stem at this point to span the central passageway. To install the valve, the free end of the stem is threaded downwardly through the central passageway, and is of sufficient length to permit grasping between one's fingers, whereupon tension applied to the stem will force the inversely truncated portion thereof to pass through the central passage and snap out to engage the underside of the recessed area floor. At this point, the disc valve will have engaged the circular rib valve seat to be thereafter normally held under tension in sealing engagement with its valve seat, and preferably to the point of causing a slight concavity in the disc valve to assure sealing.

The underside of the bottom cap of the bottle is preferably molded with a slight recess 61 centrally thereof to enable reduction in the length of the valve stem.

To permit standing of the bottle upright on a surface without interference from the valve stem, the bottom end cap 31 is formed with a depending rim 63 extending sufficiently below the end of the valve stem, to enable resting of the bottle on a surface without such probable interference.

The valve arrangement of this second embodiment functions basically in the same manner as that of the first embodiment, in that, during the drinking of the contents of the bottle by the infant, the tendency to create a differential pressure between the external atmosphere and the reduced pressure developed within the bottle, will cause the disc valve to flex away from its valve seat and permit intake of air to minimize any reduction in pressure within the bottle, and thus permit the infant to continue drinking without any adverse effects.

Upon completion of the feeding procedure, the bottom cap of the bottle assembly may be unthreaded and the valve then removed, following which, all the components may be thoroughly washed and dried and then reassembled.

In removing the valve assembly, the disc valve is first folded and grasped between two fingers of one hand while the valve stem is grasped between two fingers of the other hand, and then stretched upwardly until the inverted truncated section can be guided into the central passageway. Thereafter, the entire valve and valve stem may be withdrawn with ease.

Basically, common to both embodiments of the invention, as described above, is the fact that the applicant employs a simplified valve structure involving a disc type valve and a valve stem of like material which is both flexible and stretchable. A material admirably suited for this purpose is one known to the trade as food grade rubber. The valve stem in both instances is anchored in the central passageway of a recessed area in the bottom of the bottle. Such common features, aside from their simplicity, employ no springs or metal components which might present a problem of rusting, and utilize no shiftable components which might conceivably cause erratic functioning due to probable jamming. The valve assembly can be readily maintained in a sanitary condition, and due to its simplicity, the entire bottle assembly can be economically fabricated.

Accordingly, while I have illustrated and described my invention by way of two embodiments thereof, it will be appreciated that the same is subject to alteration and modification without departing from the underlying principles involved, and I, accordingly, do not desire to be limited in my protection to the specific details illustrated and described, except as may be necessitated by the appended claims.

I claim:

1. A feeding bottle assembly comprising a bottle having a bottom with a recessed central portion, said recessed central portion having a central passageway and at least one vent aperture to one side of said central passageway, a normally closed valve assembly including a valve seat encircling said central passageway and vent aperture, and a unitary valve and valve stem of like material installed in said recessed area with said valve engaging said valve seat and said stem secured in said central passageway under tension to normally urge said valve into such engagement with said valve seat and with just sufficient force to enable a differential pressure, created across said valve during feeding of an infant from said bottle, to momentarily lift said valve from engagement with said valve seat to admit atmosphere and minimize such differential pressure.

2. A feeding bottle in accordance with claim 1, characterized by said valve being in the form of a disc stressed by said stem into a slightly concave configuration.

3. A feeding bottle in accordance with claim 1, characterized by said unitary valve and stem being of flexible and stretchable material.

4. A feeding bottle in accordance with claim 1, characterized by said recessed area comprising a shallow cup installed in the bottom of said bottle and having a rim to function as a valve seat, and said valve spanning said cup in contact with said seat.

5. A feeding bottle in accordance with claim 4, characterized by a protective guard means for said valve in spaced relationship to the bottom of said bottle and open at its rim to admit air to said valve.

6. A feeding bottle assembly in accordance with claim 1, characterized by said bottle including a body portion, and a bottom portion removably secured to said body portion and including said valve assembly to facilitate access to both the intake and discharge ends of said valve assembly for cleaning purposes.

7. A feeding bottle assembly in accordance with claim 6, characterized by said bottom portion having a circular rib surrounding said central passageway and vent opening to constitute said valve seat, and said valve comprising a disc type valve spanning said circular rib.

8. A feeding bottle assembly in accordance with claim 7, characterized by said valve and valve stem being of material which is flexible and stretchable.

9. A feeding bottle in accordance with claim 8, characterized by said valve stem including an inverse truncated intermediate portion having a maximum diameter greater than the diameter of said central passageway.

10. A feeding bottle in accordance with claim 9, characterized by said tension being just sufficient to allow opening of said valve in response to differential pressure developed across said valve during normal feeding from said bottle.

* * * * *